Nov. 18, 1930.　　E. C. NEWCOMB ET AL　　1,781,696
INTERNAL COMBUSTION ENGINE
Filed June 4, 1928　　3 Sheets-Sheet 3

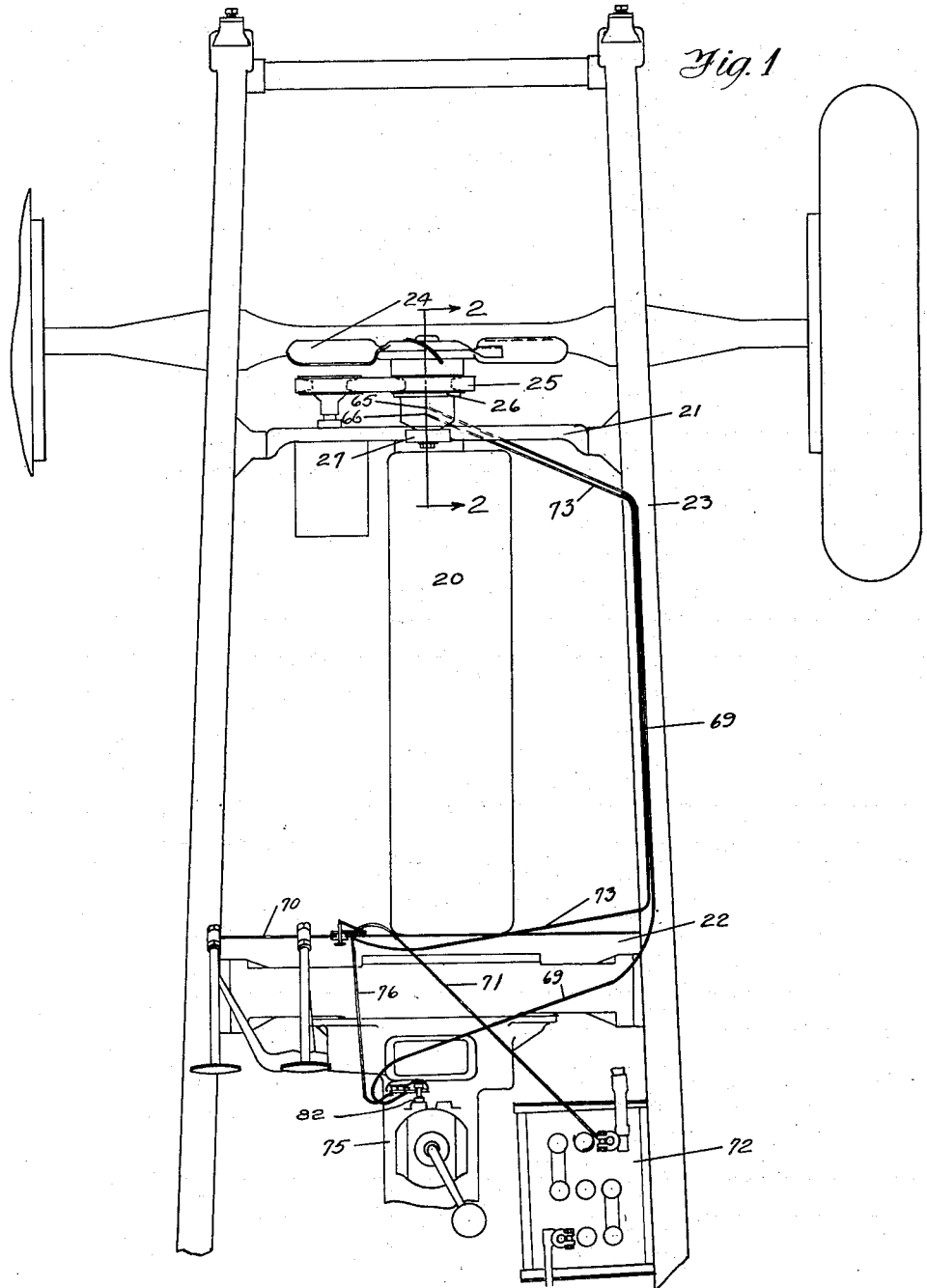

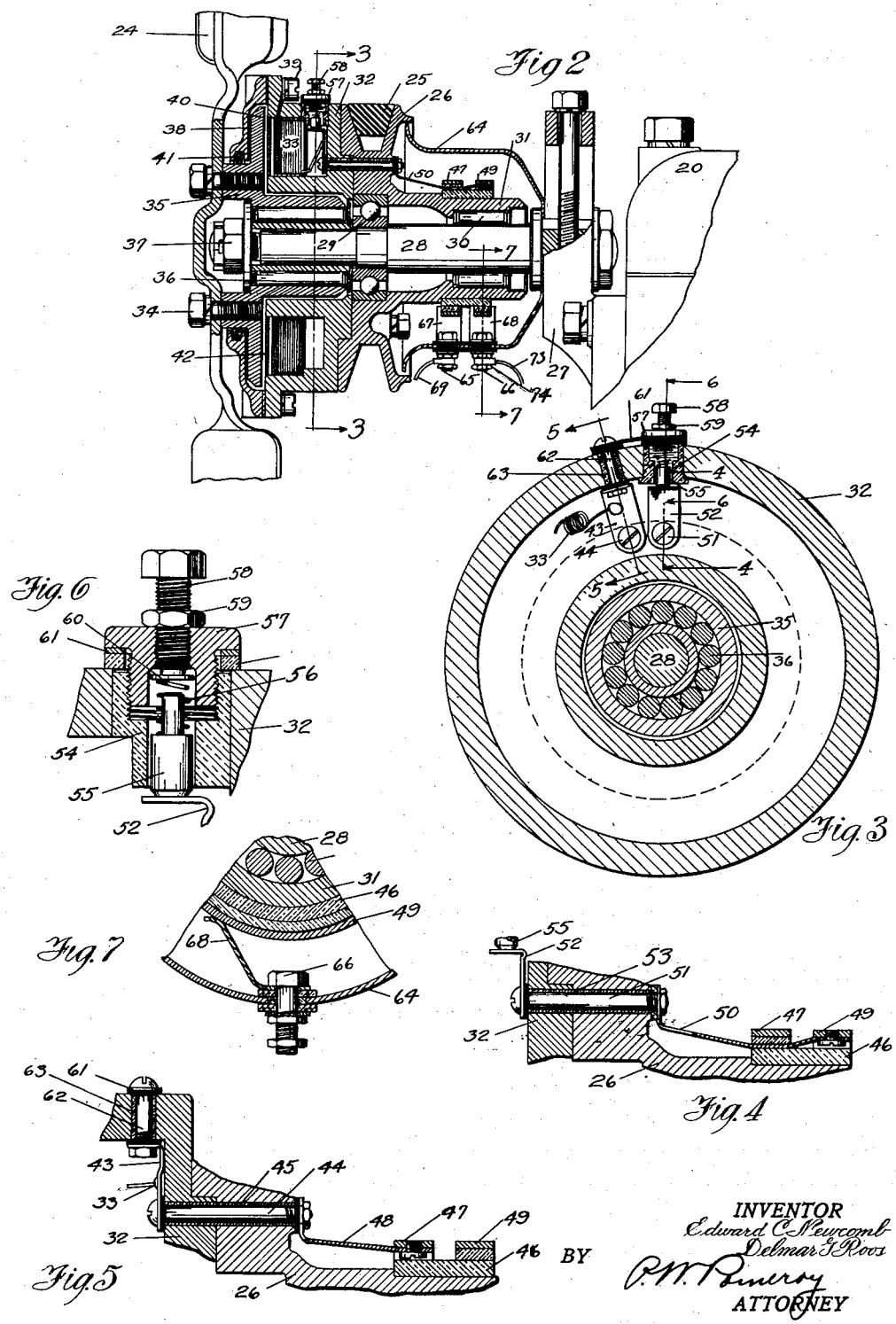

INVENTOR
Edward C. Newcomb
Delmar J. Root
BY
P. W. Pomeroy
ATTORNEY

Patented Nov. 18, 1930

1,781,696

UNITED STATES PATENT OFFICE

EDWARD C. NEWCOMB AND DELMAR G. ROOS, OF SOUTH BEND, INDIANA, ASSIGNORS TO THE STUDEBAKER CORPORATION, OF SOUTH BEND, INDIANA, A CORPORATION OF NEW JERSEY

INTERNAL-COMBUSTION ENGINE

Application filed June 4, 1928. Serial No. 282,680.

This invention relates to fans for internal combustion engines and particularly to that type adapted to become inoperative at a predetermined speed of the engine.

It has been found from a considerable number of tests that the fan for the cooling system of an internal combustion engine is not necessary above certain speeds of the vehicle. This of course, is partly dependent upon the speed of the engine. It has also been found from these tests that considerable horsepower is required to drive the fan above these predetermined speeds, which could be used to greater advantage at high speeds of the engine. In the test conducted an engine having a maximum speed of rotation of 3800 revolutions per minute was used and the tests were run in such a manner that an engine speed of 1800 revolutions per minute corresponded to approximately 40 miles per hour. This engine will be taken as an example to illustrate the present invention, although it is to be understood that any engine having a practical driving range may be used. In this engine, the wind passing through the radiator at 40 miles per hour (1800 revolutions per minute of engine) was sufficient to cool the same. Approximately 7 horsepower was required to drive the fan at 1800 revolutions per minute engine speed, and at top speed of 3800 revolutions per minute approximately 13 horsepower was required. Hence it is readily apparent that at top speeds it would be very advantageous to have the fan inoperative so that the power ordinarily used for running the fan would be available. This additional horsepower would lead to more economical operation greater acceleration and more flexibility of handling.

It is therefore, the principal object of this invention to provide an internal combustion engine with a fan for the cooling system which is inoperative at certain speeds of the same.

Another object is to provide an internal combustion engine with a magnetically controlled fan adapted to become inoperative at a predetermined engine speed.

Another object is to provide an internal combustion engine with a fan for the engine cooling system which is adapted to become inoperative at a predetermined high gear speed and to remain operative at all speeds other than high gear.

Another object is to provide an internal combustion engine with a fan for the cooling system thereof which is magnetically controlled and which is provided with a switch in the magnetic circuit adapted to be operated by centrifugal forces to disengage the fan at a predetermined speed.

A further object is to provide an internal combustion engine with a cooling fan which is magnetically controlled by a centrifugally actuated switch to disengage the fan at a predetermined high gear speed, and with a second switch adapted to keep the fan in operation at all speeds in reverse, low and intermediate gear.

These being among the objects of the present invention, the same consist of certain features of construction and combinations of parts to be hereinafter described with reference to the accompanying drawings and then claimed, having the above and other objects in view.

In the accompanying drawings which illustrate a suitable embodiment of the present invention, Figure 1 is a plan view of the forward end of a vehicle chassis having a transmission therein and having an engine provided with a magnetically controlled fan.

Figure 2 is an enlarged vertical section through the cooling fan taken on the line 2—2 of Figure 1 showing the details of construction.

Figure 3 is an enlarged section taken on the line 3—3 of Figure 2.

Figure 4 is a fragmentary enlarged view taken on the line 4—4 of Figure 3 showing the connection between the centrifugal switch and one of the collector rings.

Figure 5 is a section taken on the line 5—5 of Figure 3 showing the connection with the other collector ring.

Figure 6 is an enlarged section taken on the line 6—6 of Figure 3 showing the detailed construction of the centrifugal switch.

Figure 7 is an enlarged section taken on the line 7—7 of Figure 2 showing the connection between one of the collector rings and the electric circuit.

Figure 8:
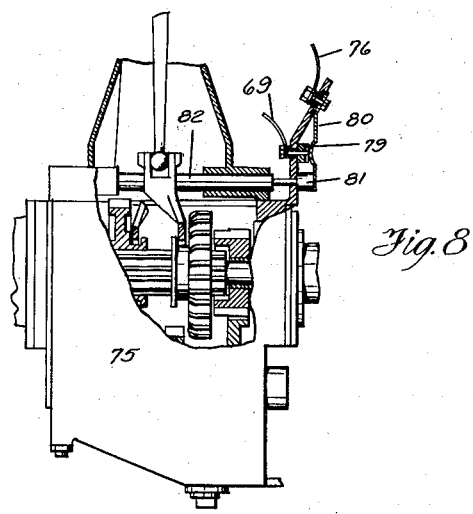
Figure 8 is an enlarged section of the switch which is located on the vehicle transmission.

Referring to the accompanying drawings in which like numerals refer to like parts throughout the several views, the internal combustion engine 20 is supported by front and rear cross members 21 and 22 respectively in the vehicle frame 23. The fan 24 for the cooling system is driven by the engine crankshaft by means of a belt 25 and a pulley 26.

As shown in Figure 2, the engine 20 is provided with a bracket 27 at its forward end which supports the fan shaft 28. A ball thrust bearing 29 and a roller bearing 30 carried by the shaft 28 rotatably supports the fan pulley 26 which is provided with a rearwardly extending hub 31. A casting 32 secured to the forward end of the pulley 26 having an annular groove receives a magnetic coil 33. The fan blade assembly 24 is secured by suitable cap screws 34 to a casting 35 which is rotatably mounted on a roller bearing 36 held on the shaft 28 by a nut 37. A plate 38 secured to the flange of the casting 32 by bolts 39 encloses the flange 40 of the casting 35 and is provided with a circular oil felt 41 which engages the hub of the casting 35. A flat plate 42 is positioned in the groove of the casting 32 to cover the coil 33, and suitable lubricant is retained in the space provided by the plate 38 so that the face of the flange 40 facing the coil 33 is always covered with a film of oil.

One end of the coil 33 is grounded to the casting 32 which has metal to metal contact thru the various connections to the vehicle frame 23 and the other end of the coil 33 leads to an L-shaped copper stamping 43 insulated from the casting 32. The stamping 43 is connected to a bolt 44 extending through the casting 32 and pulley 26 and is insulated from the same by a fiber collar 45.

An insulating collar 46 of suitable insulating material is mounted on the hub 31 of the pulley 26 and is provided with a copper collecting ring 47 which is connected by a metallic strap 48 to the bolt 44 as shown in Figure 5. As shown in Figure 4 a second collector ring 49 is mounted on the collar 46 and is connected by a metallic strap 50 insulated from the collector ring 47 to a bolt 51. The bolt 51 extends thru the pulley 26 and wall of the casting 32 into the annular groove therein where it is connected to a metallic strap 52, the bolt 51 being insulated from the pulley 26 and casting 32 by an insulating collar 53 of fiber or other suitable material.

The outer wall of the annular groove of the casting 32 receives an internally threaded collar 54. A detent or plunger 55 is positioned within the collar 54 to extend thru the same and normally abut against the flanged portion of the stamping 52. A coil spring 56 seats against the plunger 55 to normally hold the same in engagement with the stamping 52 and a screw 57 threaded into the collar 54 holds the spring 56 in compression, the screw being recessed to receive the spring 56. A cap screw 58 having a lock nut 59 threaded centrally through the screw 57 and a washer 60 abutting against the spring 56 provides suitable means for adjusting the spring 56. A strap 61 of copper or similar metal connects the screw 57 with a bolt 62 which is attached to the copper stamping 43, the bolt 62 being insulated from the casting 32 by a fiber collar 63 as shown in Figure 3.

A stationary cup-shaped member 64 encloses the collector rings 47 and 49 to exclude dirt and the like. Two bolts 65 and 66 insulated by fiber collars extend through the cup-shaped member 64 and are provided with strap members 67 and 68 of spring metal respectively, the strap member 68 contacting with the collector ring 49 and the strap member 67 contacting with the collector ring 47. These two strap members 67 and 68 carry electric current to the collector rings 47 and 49 respectively.

As shown in Figure 2 a wire 73 attached to the bolt 66 by a nut 74 leads back to one pole of a switch, which will be described later, positioned on the vehicle dash 70, and a second wire 71 connects the other pole of the switch with the battery 72. A wire 69 attached to the bolt 65 leads to one pole of a switch, which will be described later, actuated by the high gear shift rod of the vehicle transmission 75. The other pole of this switch is connected by a wire 76 to the switch positioned on the vehicle dash board 70.

Figure 9:
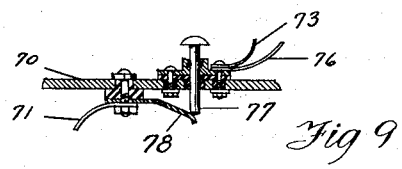
Figure 9 is an enlarged section of the direct control switch located on the vehicle dash.

The dash switch comprises two poles 77 and 78 as shown in Figure 9, the pole 77 being the plunger to which the wires 73 and 76 are connected, and the pole 78 being the spring contact strap to which the wire 71 leading to the battery is connected.

The switch operated by the transmission 75 likewise comprises two poles 79 and 80, the pole 79 being connected to the wire 69 and the pole 80 being connected to the wire 76. The pole 80 is preferably made of spring metal and is actuated by a plunger 81 that is moved by the slidable high and intermediate gear shifter rod 82. This switch is so arranged that when the shifter rod 82 is moved forward to place the transmission in high gear, the poles 79 and 80 are out of contact with each other, that is, the electric circuit is broken. It is also arranged so that when the transmission is in neutral, low, intermediate or reverse gears, the poles 79 and 80 contact with each other, that is, the circuit is closed. The reasons for this arrangement will be apparent from the following description.

Figure 10:
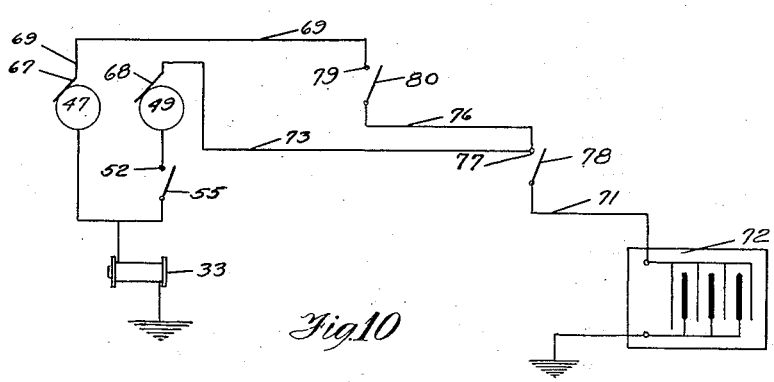
Figure 10 is a diagrammatic view of the complete electric circuit.

The complete circuit can be best described by referring to the wiring diagram shown in Figure 10. With the poles 79 and 80 of the transmission switch in contact with each other, that is, when the transmission is in neutral, low, intermediate or reverse gears, the current from the battery 72 passes thru the wire 71 to the dash switch which is closed and then passes thru the wires 76 and 69 to the collector ring 47 which is connected directly to one end of the coil 33, and finally grounds thru the casting 32 and then returns to the battery 72 through the battery ground. In passing thru the coil 33, a magnetic attraction is set up which causes the plate 40 and therefore the fan blades 24 to be drawn into contact with the casting 32 so that the fan blades 24 will rotate therewith at all speeds of the engine. Now when the transmission is shifted into high gear, the shifter lever 82 then moves the plunger 81 forward to break the contact between the poles 79 and 80 and to open the circuit. The current then must pass from the dash switch into the wire 73 to the collector ring 49 where it is transmitted to the coil 33 thru the centrifugal switch comprised of the plunger 55 and copper stamping 52.

In this case, a magnetic attraction is set up which causes the plate 40 to contact with the casting 32 so that the fan 24 will rotate therewith. But as soon as the engine 20 reaches a certain speed, for example 1800 revolutions per minute, centrifugal force produced by the rotating fan pulley 26 and casting 32 causes the plunger 55 to move outwardly against the compression of the spring 56 which breaks its engagement with the stamping 52 and therefore opens the electric circuit. This opening of the circuit causes the coil 33 to cease functioning as a magnet and the wind resistance then causes the fan 24 to move independently of the pulley 26. The result of this is that the horse-power ordinarily required to drive the fan 24 at this speed is available for use which is very advantageous. This is true for any engine speed above the predetermined speed when the vehicle is in high gear. However, when the speed of the engine drops below the predetermined amount where forced draft is necessary to cool the engine, the plunger 55 assumes its normal position and again contacts with the stamping 52 to close the circuit so that the fan 24 will be driven by its magnetic connection with the casting 32.

The switch on the vehicle dash 70 is provided so that when the vehicle is left inoperative for a considerable length of time the circuit may be broken. The circuit may also be arranged that it can be connected with the ignition switch.

The transmission switch is provided for reasons which are readily apparent. It is understood when a vehicle is in low, intermediate or high gears that the engine rotates at a much faster speed than when in high gear. It is necessary then when the vehicle is shifted into low or intermediate gears when climbing hills or making heavy pulls thru sand or mud that means must be provided so that the fan will operate at all speeds in these gears, hence the transmission controlled switch.

It is believed from the drawings and foregoing description that any one skilled in the art will readily understand and will appreciate the advantages of the present invention.

It is to be understood however, that formal changes may be made in the specific embodiment of the invention described without departing from the spirit and substance of the broad invention, the scope of which is commensurate with the appended claims.

What I claim is:—

1. In an internal combustion engine, a cooling fan therefor, driving means for said fan, magnetic means for normally holding said fan in engagement with said driving means at speeds less than a predetermined speed of said driving means and means for controlling the action of the magnetic means independent of the speed of the driving means.

2. In an internal combustion engine, a cooling fan therefor, driving means for said fan, magnetic means normally holding said fan in engagement with said driving means, means adapted to disengage said fan from said driving means at a predetermined speed thereof and means for controlling the action of the magnetic means independent of the speed of the driving means.

3. In an internal combustion engine, a cooling fan therefor, driving means normally holding said fan in engagement with said driving means for said fan, magnetic means, controlled by the speed of said driving means adapted to disengage said fan from said driving means at a predetermined speed thereof and means for controlling the action of the magnetic means independent of the speed of the driving means.

4. In an internal combustion engine, a cooling fan therefor, driving means for said fan, magnetic means normally holding said fan in engagement with said driving means, a switch in the magnetic circuit controlled by centrifugal force adapted to break said circuit to allow disengagement of said fan from said driving means at a predetermined speed thereof and means for controlling the action of the magnetic means independent of the speed of the driving means.

5. In an internal combustion engine, a cooling fan therefor, driving means for said fan, magnetic means normally holding said fan in engagement with said driving means, a switch carried by said driving means adapted to be opened by centrifugal force at a predetermined speed of said driving means to break the magnetic circuit for allowing rotation of said driving means relative to said fan and means for controlling the action of the magnetic means independent of the speed of the driving means.

6. In a motor vehicle having an engine and a transmission, a cooling fan for said engine, driving means therefor, magnetic means for normally holding said fan in engagement with said driving means, a centrifugally controlled switch for breaking the magnetic circuit to disengage said fan from said driving means, and a switch controlled by said transmission connected with said centrifugally controlled switch to allow operation of said centrifugally controlled switch when said transmission is in top speed only.

7. In a motor vehicle having an engine and a transmission, a cooling fan for said engine, driving means for said fan, magnetic means normally holding said fan in engagement with said driving means, a switch controlled by said transmission having an electric circuit leading to said magnetic means and having a second circuit leading to said magnetic means, and a switch in said second circuit controlled by the speed of said driving means, whereby when transmission is in top speed said speed controlled switch causes said fan to disengage from said driving means at a predetermined speed thereof, and when said transmission is in any other speed said second circuit is broken to allow operation of said first mentioned circuit to prevent disengagement of said fan while said transmission is in any speed other than said top speed.

8. In an internal combustion engine, a cooling fan therefor, driving means for said fan, a magnetic coil carried by said driving means, a collector ring carried by said driving means, a connection between said coil and collector ring, and a connection leading from said collector ring to a source of electrical energy whereby electrical energy passing thru said circuit causes said magnetic coil to normally hold said fan in engagement with said driving means.

9. In an internal combustion engine, a cooling fan therefor, driving means for said fan, a magnetic coil carried by said driving means, a collector ring carried by said driving means, a connection between said coil and collector ring, a wire leading from said collector ring to a source of electrical energy for conducting electrical energy to said coil, said coil being adapted to magnetically hold said fan in normal engagement with said driving means, and a centrifugally actuated switch interposed between said coil and collector ring adapted to break the magnetic circuit at a predetermined speed to disengage said fan from said driving means at said predetermined speed.

10. In a motor vehicle having an engine and a transmission, a cooling fan for said engine, driving means for said fan, a controllable connection between the driving means and the fan, speed responsive mechanism for controlling said connecting means, and means controlled by the action of the transmission for rendering the speed responsive means either operative or inoperative.

11. In a motor vehicle having an engine and a variable speed transmission, a cooling fan for said engine, driving means for the cooling fan, a controllable connection between the driving means and the fan, speed responsive means for controlling said connection, and means controlled by the action of the transmission for rendering the speed responsive means operative or inoperative to control the action of the connection between the driving means and the fan.

Signed by us at South Bend, Indiana this 31st day of May, 1928.

EDWARD C. NEWCOMB.
DELMAR G. ROOS.